United States Patent [19]
Ito et al.

[11] Patent Number: 5,559,768
[45] Date of Patent: Sep. 24, 1996

[54] TRACKING FOLLOWING APPARATUS FOR OPTICAL DISK DEVICE

[75] Inventors: Masamichi Ito, Ibaraki-ken; Masahiro Takasago, Odawara, both of Japan

[73] Assignee: Hitachi, Ltd., Tokyo, Japan

[21] Appl. No.: 267,395

[22] Filed: Jun. 29, 1994

[30]     Foreign Application Priority Data

Jun. 29, 1993    [JP]    Japan ................................. 5-158546

[51] Int. Cl.⁶ ............................................ G11B 7/00
[52] U.S. Cl. ........................ 369/44.25; 369/44.28; 369/44.34; 369/44.35
[58] Field of Search ............................... 369/44.28, 44.29, 369/44.34, 32, 54, 44.35, 44.36, 124, 77.04, 44.25; 360/78.04, 78.05, 78.07, 78.09, 78.12

[56]              References Cited

U.S. PATENT DOCUMENTS

| | | | |
|---|---|---|---|
| 4,562,562 | 12/1985 | Moriya et al. | 369/44.28 |
| 5,285,435 | 2/1994 | Takasago | 369/44.28 |

FOREIGN PATENT DOCUMENTS

| | | |
|---|---|---|
| 0057085 | 12/1985 | Japan . |
| 0130369 | 5/1989 | Japan . |
| 3-127337 | 5/1991 | Japan . |

OTHER PUBLICATIONS

"The Journal of Institute of Television Engineers of Japan", vol. 43, No. 5, 1989, pp. 498–504.

*Primary Examiner*—Aristotelis Psitos
*Assistant Examiner*—Thang V. Tran
*Attorney, Agent, or Firm*—Antonelli, Terry, Stout & Kraus

[57]              ABSTRACT

A tracking following apparatus for an optical disk device includes an objective for forming a light spot on an optical disk, a fine actuator for driving the objective, a coarse actuator for driving the fine actuator means, a detector for sensing a relative positional error between the light spot and a track on the optical disk, an RAM for keeping therein a drive signal associated with a rotation of the optical disk to drive the coarse actuator, an attenuator for reading from the RAM a drive signal associated with a disk rotation angle when the error is sensed by the detector and attenuating the signal, and an adder for adding the signal attenuated by the attenuator to the error signal sensed by the detector and thereby generating a drive signal to drive the coarse actuator.

3 Claims, 5 Drawing Sheets

TRACKING FOLLOWING APPARATUS FOR OPTICAL DISK DEVICE

BACKGROUND OF THE INVENTION

The present invention relates to a tracking following apparatus for an optical disk device, and in particular, to a tracking following apparatus for an optical disk device having two systems of actuators including a fine actuator and a coarse actuator.

In an optical disk device, a laser beam is focused through an objective into a light spot to read and to write data from and on an optical disk. In a device of this type, when an optical disk installed therein is rotated, the disk is attended with disk eccentricity of at most about 50 micrometers. The disk eccentricity leads, during the operation of the disk device, to displacement of tracks according to a period primarily related to the disk rotation frequency. Since the track pitch is about one micrometer, the tracking precision of the light spot is required to be about 0.1 micrometer or less.

To achieve such a high tracking precision for the light spot, there has been conventionally employed an optical disk device having a fine actuator which controls the objective such that the light spot continuously conducts a fine tracking operation with respect to the tracks of the optical disk and a coarse actuator which compensates for an error appearing in an interval of the rotation cycle of the optical disk.

For detecting a relative positional error between the light spot and a track on the optical disk, a light sensor senses light of the light spot reflected from the disk surface to attain a track error signal representing the relative positional error.

When displacement of the objective disposed on the fine actuator from a reference position of the objective becomes about several tens of micrometers (μm) or more, there appears in the track error signal a noise which cannot be ignored, and hence the relative positional error between the light spot and the pertinent track cannot be exactly sensed.

To overcome this difficulty, the displacement of the objective is required to be equal to or less than about several tens of micrometers.

To achieve the tracking following control for the light spot, there is ordinarily used a circuit having functions, for example, a function to compensate for lead of phase according to a tracking error signal so as to produce signals to drive the fine and coarse actuators, thereby driving these actuators.

With an increased gain to drive the fine actuator, the displacement of the objective becomes greater at the disk rotary frequency. As a result, the objective displacement exceeds about several tens of micrometers (μm) and a noise which cannot be ignored appears in the track error signal. Consequently, it is impossible to achieve a correct tracking following operation.

On the other hand, increasing the gain to drive the coarse actuator, there occurs unexpected vibration of the coarse actuator not considered in the system design stage and hence the light spot is displaced from the track. For these reasons, the gain of the coarse actuator is limited.

Consequently, there has been proposed, in place of the device increase the gain of the fine or coarse actuator, a tracking control system to conduct a feedforward compensation. For example, there has been described in the JP-A-3-127337 a tracking control system in which a waveform signal of the head vibration due to eccentricity of the optical disk is beforehand memorized when the control operation is started so as to carry out the feedforward compensation by sending the vibration waveform signal to the coarse actuator system.

Moreover, for example, in the JP-B2-60-57085, the JP-A-1-130369, and pages 498 to 504 of the Journal of Institute of Television Engineers of Japan, Vol. 43, No. 5 (1989), there has been described a tracking control system conducting the feedforward compensation in which a tracking error signal related to a rotation of the optical disk is beforehand memorized such that the stored error signal is added to an error signal obtained in the subsequent rotation of the disk, thereby using the resultant signal as a tracking control signal. Until the sensed error signal becomes zero, the error signal of each subsequent disk rotation is accumulated to achieve a so-called repetitive control system.

However, in such a tracking control system using the repetitive control system as the feedforward compensation, to attain a value of feedforward compensation in which the error signals are accumulated for many disk rotations for a high-precision tracking, there are necessitated a multiplicity of learning operations consuming a long period time.

SUMMARY OF THE INVENTION

It is therefore an object of the present invention to provide a tracking following apparatus for an optical disk device in which a feedforward compensation is utilized to achieve a correct positioning in a short period of time.

In accordance with the present invention, there is provided a tracking following apparatus for an optical disk including an objective for producing a light spot on an optical disk, a fine actuator for driving the objective, a coarse actuator for driving the fine actuator, and a sensing device for sensing a relative positional error between the light spot and a track on the optical disk. A drive signal to drive the coarse actuator is stored in a storage for a period of rotation of the optical disk such that the stored value is thereafter read from the storage at a timing synchronized with the rotation of the optical disk. The obtained signal is then attenuated and is added to another error signal sensed by the sensing device so as to use the resultant signal as a drive signal of the coarse actuator.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
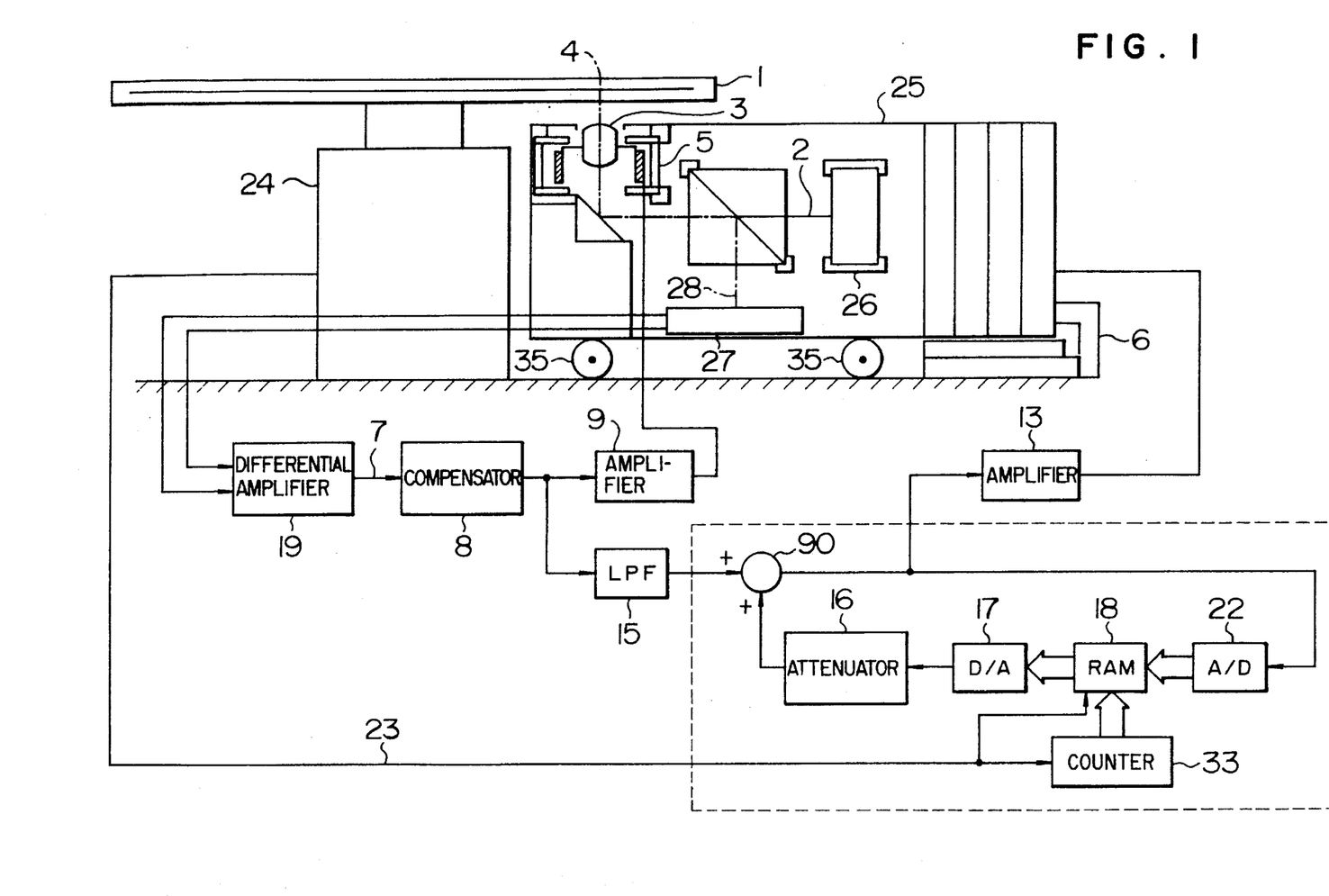
FIG. 1 is a block diagram showing a tracking following apparatus for an optical disk in an embodiment according to the present invention.

Referring now to the drawings, description will be given of an embodiment of a tracking following apparatus for an optical disk according to the present invention. In FIG. 1, a block enclosed with a dotted line represents a primary aspect of the present invention.

In FIG. 1, the optical disk device includes an optical disk 1, a spindle motor 24 for rotating the disk 1, a head 25 for reading and writing data from and on the disk 1, a circuit section for controlling the head 25. The read/write head 25 includes an objective 3 for focusing a laser light 2 emitted from a light source 26, a fine actuator 5 for driving the objective 3, and a detector 27 for sensing a servo signal (including a tracking error signal and a focusing error signal) from a light 28 reflected from the disk 1. In FIG. 1, there is shown a servo system utilizing the tracking error signal, whereas the data detecting or sensing system is not shown.

The servo system above includes a section to set the tracking error signal obtained by the detector 27 substantially to zero, the section including a coarse actuator 6 for controlling and driving the overall body of the head 25 and the fine actuator 5 for causing the light spot to follow a pertinent track of the disk 1.

When the optical disk 1 is mounted in the optical disk device, there appears a maximum of about 50 micrometer eccentricity of the disk 1 between a central axis of the disk 1 and that of the spindle motor 24. Due to the disk eccentricity, when the disk 1 is rotated at a rotary speed of 2000 rotations per minutes (rpm) by the motor 24, there is sensed by the detector 27 a tracking error signal having a period corresponding to the rotation frequency of the spindle motor 24. The servo system conducts feedback control for the fine actuator 5 and the coarse actuator 6 so that the light spot 4 moves on the optical disk 1 to follow the track. The feedback control is effected in a configuration in which the tracking error signal is passed to a compensator 8 and a low-pass filter 15, which will be described later, so as to attain drive signals of the respective actuators, thereby driving the coarse and fine actuators.

The laser light 2 produced from the light source 26 is incident to the object 3 to be focused into the light spot 4. The light spot 4 is reflected from the optical disk 1 as a reflection light 28 to be received by the detector 27. As a result, there is detected a positional error between the light spot 4 and the track of the disk 1. The detector 27 includes a two-partition photodiode. The photodiode produces two kinds of signals having therebetween a difference in a quantity of light according to each tracking error. These error signals are fed to a differential amplifier 19 so as to obtain therefrom a tracking error signal 7.

The error signal 7 is fed to a fine compensator 8 including a capacitor and a resistor and having a function to compensate for a lag and a lead in the phase. A signal thus processed through the fine compensator 8 is delivered to an amplifier 9 for amplification thereof. The amplified signal is used to drive the fine actuator 5 such that the light spot follows the track on the disk 1.

Next, description will be given of operation to control the coarse actuator 6. The signal outputted from the fine compensator 8 is supplied to a low-pass filter 15 to remove a high-frequency component therefrom. The filter 15 has a cutoff frequency higher than the primary resonance frequency of the fine actuator 5 to satisfy a condition of stabilizing the coarse actuator 6.

The signal from the filter 15 is added to a signal outputted from an attenuator 16 by an adder 90. A signal resultant from the addition is then amplified by an amplifier 13. The amplified signal is used to drive the coarse actuator 6. The output signal from the adder 90 is converted through an analog-to-digital (A/D) converter 22 into a digital signal to be sequentially stored in an RAM 18. The RAM 18 has two storage areas including a first storage area to store therein data from the A/D converter 22 and a second storage area in which the data stored in the first storage area is entirely written so as to be later sequentially read therefrom.

The spindle motor 24 generates in synchronism with the disk rotation a reference pulse at a position of a reference rotary angle of the disk 1 and a clock pulse for each predetermined rotary angle, thereby outputting the reference and clock pulses onto a line 23. A counter 33 counts the clock pulses from the motor 24 to create an address and then feeds the address to the RAM 18 for a simultaneous access to the first and second storage areas of the RAM 18. The reference pulse from the motor 24 resets the counter 33 and causes the data of the first storage area to be completely moved to the second storage area of the RAM 18. Consequently, according to the address from the counter 33, the first and second storage areas of the RAM 18 are respectively accessed such that the data from the A/D converter 22 is stored in the first storage area at the address specified by the counter and a data read operation is conducted in the second storage address at the specified address so as to send the obtained data to a digital-to-analog (D/A) converter 17. As a result, data of the error related to the previous disk rotation is kept in the RAM 18 such that the data of the previous error is read therefrom for each associated rotary angle.

The analog signal created from the D/A converter 17 is attenuated by the attenuator 16 to be supplied to the adder 90. Consequently, a tracking error signal for a pertinent rotary angle is added by the adder 90 to error data related to the pertinent rotary angle to store a resultant signal in the RAM 18. The resultant signal is sent as a tracking error signal to the coarse actuator 6.

In consequence, the coarse actuator system repeatedly conducts, according to the error data of the preceding disk rotation, a feedforward control for each disk rotation to conduct a repetitive control system compensation of the tracking error of the light spot due to the disk eccentricity.

Subsequently, a detailed description will be given of the servo system according to the present invention.

The fine actuator 5 supports the objective 3 as a control object thereof by a plate spring and has a resonance point at a frequency higher than the rotary frequency of the optical disk. No lag of phase appears for a frequency equal to or less than that of the resonance vibration of the plate spring. On the other hand, the coarse actuator 6 is an inertia system supported by ball bearings 35 and also has a phase lag of −180°. Consequently, in the operation of the servo system associated with the disk eccentricity, the fine actuator 5 operates according to a phase substantially opposite to that of the coarse actuator 6.

Assume that the fine compensator 8, the fine actuator 5, the coarse filter circuit 15, and the coarse actuator 6 have characteristics CF(S), PF(S), CL(S), and PC(S), respectively. Each of the other constituent elements has substantially an invariable frequency characteristic and the value thereof is assumed to be one for simplicity of description. In this situation, the magnification factor N(S) of the displacement XC(S) of the coarse actuator 6 with respect to the disk eccentricity XREF is represented as follows.

$$N(S) = \frac{XC(S)}{XREF} = \frac{CF(S) \cdot CL(S) \cdot PC(S)}{1 + CF(S)(CL(S) \cdot PC(S) + PF(S))} \quad (1)$$

Assuming the coarse driving value to drive the coarse actuator 6 to be IC(S), the displacement XC(S) of the coarse actuator 6 is expressed as $$XC(S)=IC(S) \cdot PC(S) \qquad (2)$$

According to the expressions (1) and (2), there are attained $$XC(S)=N(S) \cdot XREF \qquad (3)$$

$$XREF = PC(S) \cdot \frac{IC(S)}{N(S)} \qquad (4)$$

In the repetitive control system, since the coarse driving value IC(S) is kept in the RAM 18 to be adopted as a feedforward compensation value, it is highly desirable that the coarse displacement value XC(S) to be driven according to the feedforward compensation value IC(S) matches the disk eccentricity XREF.

However, as described above, the coarse actuator conducts operation in a phase opposite to a phase in which the fine actuator achieves operation. Consequently, in the divisor of the expression (1), the characteristic PC(S) of the coarse actuator has a sign opposite to that of the characteristic PF(S) of the fine actuator, namely, these two terms form a subtraction. In consequence, the coarse actuator achieves a compensating operation with a displacement value larger than the disk eccentricity. According to the expression (3), the displacement is N(S) times the disk eccentricity. In short, the magnification factor N(S) exceeds one and the displacement of the coarse actuator is larger than the disk eccentricity, and hence the error data kept in the RAM 18 takes a value slightly larger than the actual disk eccentricity.

Consequently, in other than the case using the construction in which the feedforward signal attained from the RAM 18 is attenuated by the attenuator, since a stable operation state is reached by achieving the learning many times according to the repetitive control system operation, there is required too much time.

According to the present invention, the error data IC(S) is attenuated to 1/N by the attenuator 16 to be supplied as the feedforward value to the coarse actuator. Resultantly, as can be understood from the expression (4), the displacement of the coarse actuator can be set to a value matching the disk eccentricity. That is, the disk eccentricity is compensated for only by the operation of the coarse actuator, whereas it is not necessary for the fine actuator to conduct any compensating action with respect to the rotary frequency component associated with the disk eccentricity. Consequently, there is obtained the highly desirable operation state.

As above, since there is obtained the condition under which the displacement of the coarse actuator matches the disk eccentricity, the coarse actuator follows the disk eccentricity with a high precision and hence the operation state is stabilized through a reduced number of iterative operations. In consequence, the fine actuator can achieve a control operation for the light spot to follow the pertinent track with a high accuracy.

In this connection, since the feedforward compensation value created from the D/A converter 17 is attained on the basis of a signal supplied from the feedback system, there is also obtained an advantageous effect that deviation of the servo system is absorbed.

Although not shown in the drawings, there is calculated a difference between the value of the RAM 18 before modification and that of the RAM 18 after modification such that the operation to acquire data from the A/D converter 22 is interrupted when the difference becomes equal to or less than a preset value. The feedforward compensation value 20 is produced without modifying the value of the RAM 18. With the condition change-over operation, there is attained an advantage of minimization of power consumed by the A/D converter 22.

Figure 2:
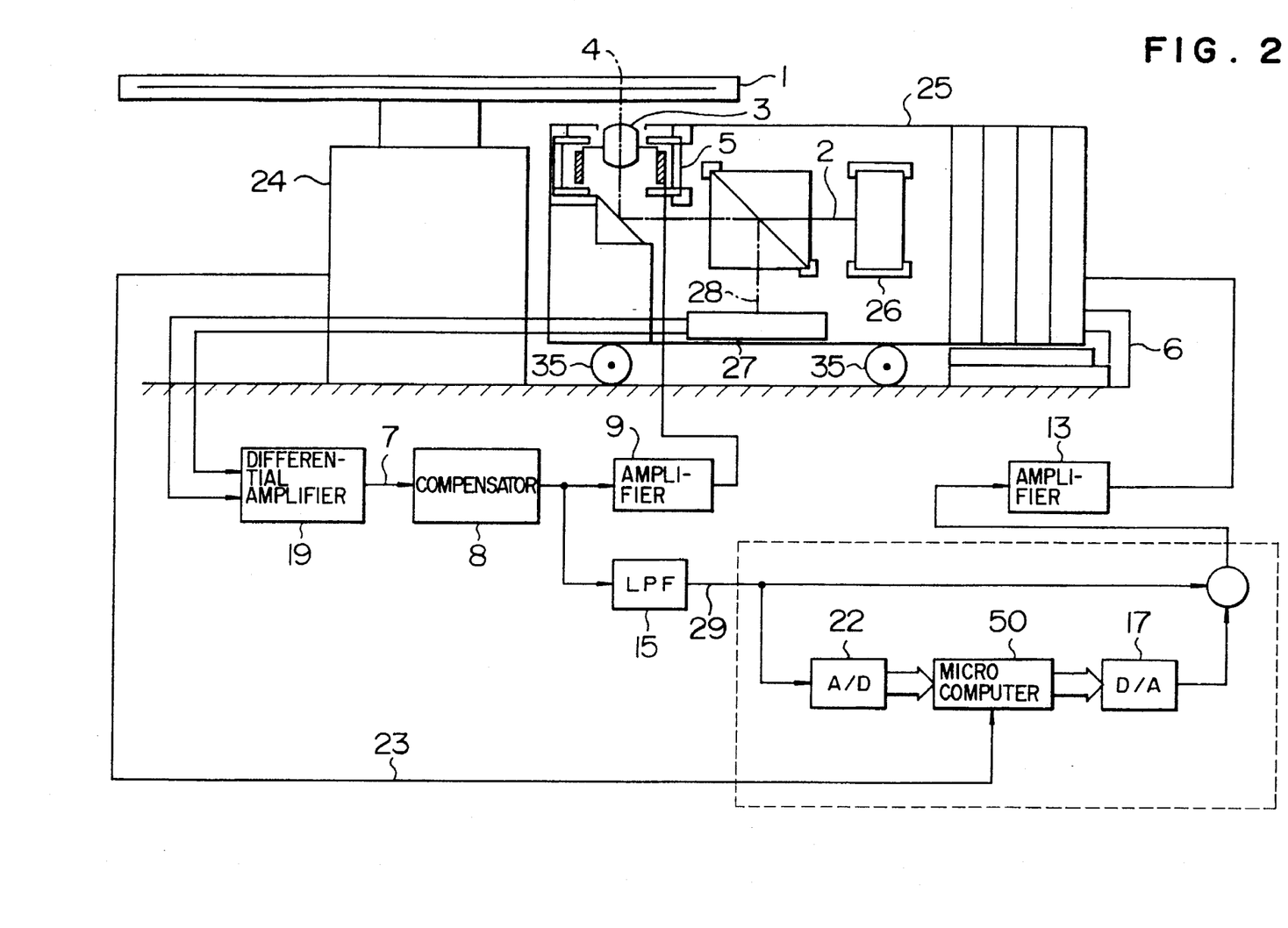
FIG. 2 is a block diagram showing another embodiment of a tracking following apparatus for an optical disk according to the present invention.

Referring next to FIG. 2, description will be given of another embodiment of the tracking following apparatus according to the present invention. Since only the circuit section varies between the configuration of this embodiment and that of the embodiment of FIG. 1, description will be given only of this section. A micro computer 50 conducts functions of the RAM 18, the counter 33, and the attenuator 16 of the embodiment shown in FIG. 1. In contrast with the operation of FIG. 1 in which the sum of the feedforward value and the feedback value is inputted to the A/D converter 22, only the feedback value is supplied to the A/D converter 22 on the line 29 in FIG. 2. The feedforward value from the D/A converter 17 and the feedback value are added to each other to obtain the coarse driving value. The effect of the feedforward operation can be confirmed by recognizing that the feedback value is reduced.

The micro computer 50 includes an input RAM for keeping therein data received from the A/D converter 22, an output RAM for outputting therefrom processed data to the D/A converter 17, and an RAM and a central processor unit necessary for achieving operations. Adoption of the micro computer 50 advantageously decreases the circuit size.

Internal processing of the micro computer 50 will be described. The computer 50 includes a program primarily classified into three parts, namely, an initial part, an input part for reading data from the A/D converter 22 and processing the data, and an output part for outputting data to the D/A converter 17. When the system is powered, the initial part is executed. During the track following operation, the input and output parts are concurrently executed.

Figure 3:
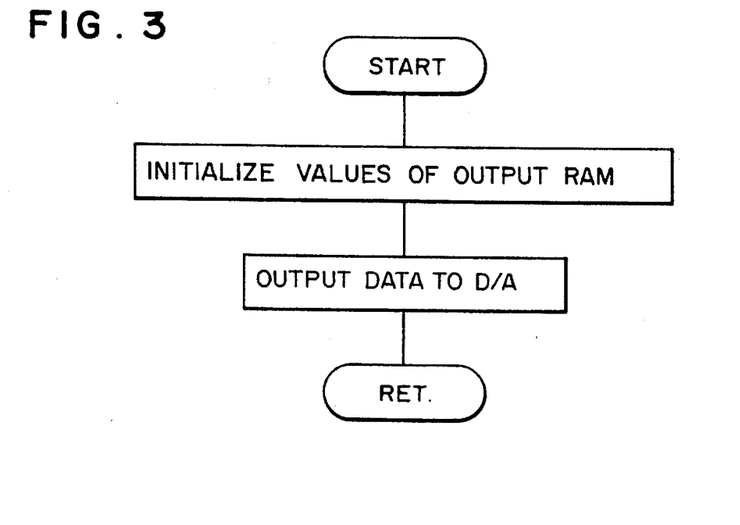
FIG. 3 is a flowchart showing an initial portion of a processing procedure in the embodiment of FIG. 2.

The initial part will be described by reference to the flowchart of FIG. 3. When the output RAM contains a wrong data item, there may resultantly occur an erroneous operation. To avoid the error, the contents of the output RAM are initialized to zeros, namely, zeros are outputted to the D/A converter 17.

Next, the input part to read data from the D/A converter 22 will be described by referring to FIG. 4. To start reading data beginning at a reference rotary angle of the disk, the program is set to a wait state until a rotary angle sense pulse is supplied from the spindle motor 24. After the pulse is delivered, it is started to read data from the A/D converter 22. That is, for each sampling period, the data obtained from the A/D converter 22 is stored in the input RAM beginning at the first address thereof. For example, assuming that the disk rotary frequency and the sampling frequency are respectively 50 Hz and 2.5 kHz, 50 sampling operations are conducted for each disk rotation.

After the data related to one disk rotation is thus attained, there is determined the maximum value XMAX among the values read from the A/D converter 22 so as to compare the maximum value with a reference value. When the disk eccentricity is small, the values inputted from the A/D converter 22 become smaller. Consequently, the reference value is reduced enough to decide that the disk eccentricity is sufficiently small. If the XMAX value is less than the reference value, the processing is completed; otherwise, a correction is required and hence control is passed to a subsequent step. However, after the processing is completed, the state in which the XMAX value is smaller than the reference value is continuously monitored. When this state is changed, the RAM value is again altered.

Next, when the maximum value of the data read from the A/D converter 22 is larger than the reference value, a value less than one is multiplied by the value of data. The coefficient for the correction is represented as a reciprocal of the value N(S) obtained from the expression (1). The function of the coefficient corresponds to that of the attenuator 16 of the embodiment described above. At this point of time, since the first correction has not been finished yet, the value outputted from the D/A converter 17 is zero. In the second and subsequent corrections, since data is already stored in the output RAM, a meaningful data item is created from the D/A converter 17. The value from the output RAM is added to that from the input RAM to store a resultant value in the output RAM. Thereafter, to check the operational effect of the correction, control is returned to the initial processing to wait for the rotary angle sense pulse 23.

Figure 5:
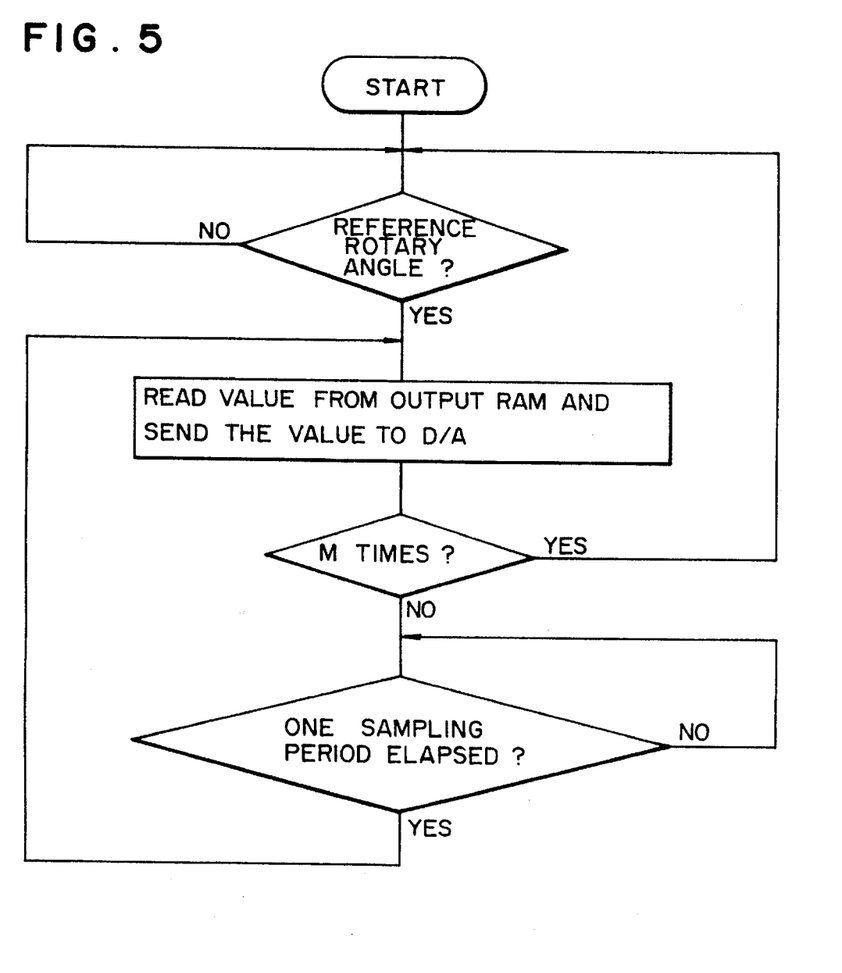
FIG. 5 is a flowchart showing operation to read data from an output random-access memory (RAM)

FIG. 5 shows in a flowchart a portion of operation to output data to the D/A converter 17.

Values set to the output RAM are read therefrom to be outputted to the D/A converter 17 for each sampling period at a timing synchronized with the rotary angle sense pulse.

In a case where the feedback value 29 contains a noise component having a frequency higher than the disk rotary frequency, there is accomplished a noise processing, as indicated by the dotted line in FIG. 4, by use of data kept in the micro computer 50 according to a moving average method, which will be described later. This removes the noise synchronized with the disk. When the processing is executed in the moving average method in which the attenuation is effected as 1/N for the disk rotary frequency, there can also be conducted the processing in which the coefficient of correction is multiplied by the data.

When there exists a noise component of a frequency not exceeding the disk rotary frequency, the operation above is continuously accomplished for two or more disk rotation cycles to compute a blocking average, thereby preventing the offset associated with the low frequency.

Figure 4:
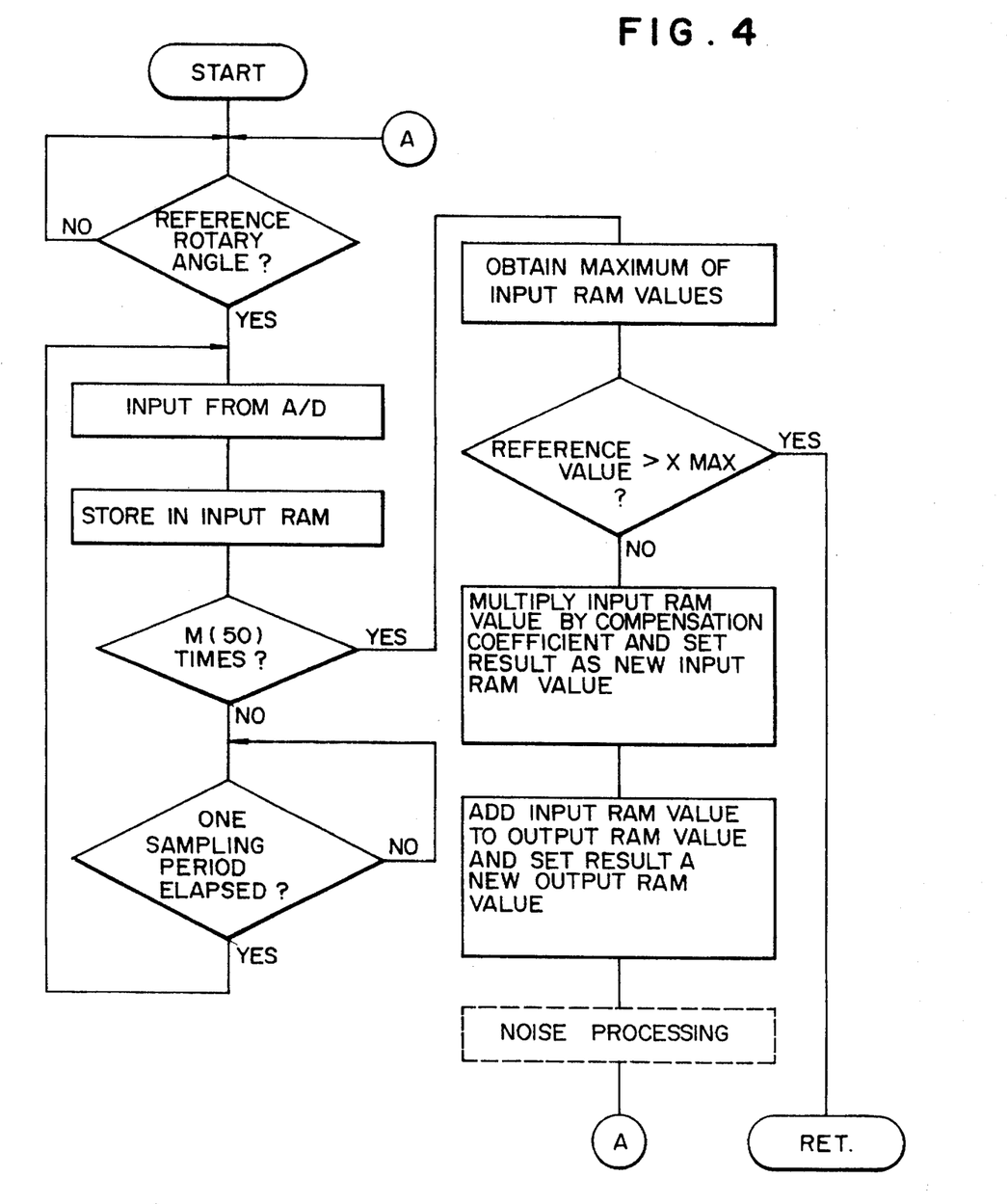
FIG. 4 is a flowchart showing a data read portion of the processing procedure in the embodiment of FIG. 2.
Figure 6:
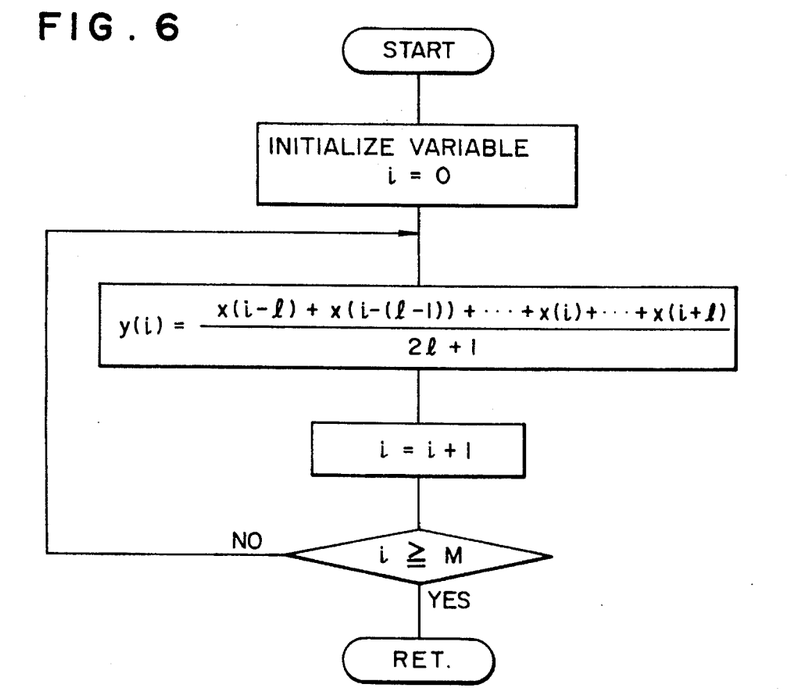
FIG. 6 is a flowchart showing a noise processing procedure employing a moving mean method.

FIG. 6 shows in a flowchart applicable to a case where the noise processing indicated by the dotted line in FIG. 4 is executed according to the moving average method.

In the flowchart of FIG. 6, assume M data items for one disk rotation cycle to be $x(0), x(1), \ldots,$ and $x(M-1)$.

Assume that M data items processed according to the moving average method are $y(0), y(1), \ldots,$ and $y(M-1)$. The $2 l + 1$ moving average processing is achieved as follows. Arbitrary data $y(i)$ ($i=0, \ldots, M-1$) is computed as $$y(i) = \frac{x(i-l) + x(i-(l+1)) + \ldots + (xi) + x(i+l)}{2l+1},$$

where $i=0, \ldots, M-1$. The obtained data is written in the output RAM. In the expression, for $i-l<0$, the value of $i-l+M$ is used; for $i-(l-1)<0$, the value of $i-(l-1)+M$ is used; $\ldots$, for $i-1<0$, the value of $i-1+M$ is used; moreover for $i+l>M-1$, the value of $i+l-M$ is used; for $i+(l-1)>M-1$, the value of $i+(l-1)-M$ is used; $\ldots$, for $i+1>M-1$, the value of $i+1-M$ is used.

Figure 7:
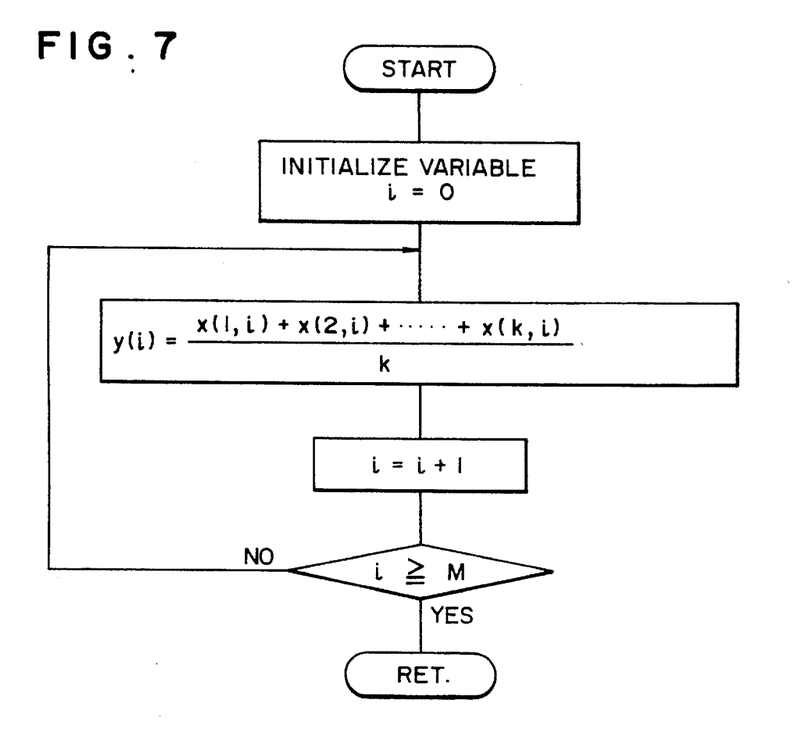
FIG. 7 is a flowchart showing a noise processing procedure employing a blocking mean method.

Referring now to FIG. 7, description will be given of an embodiment of processing in which the noise processing indicated by the dotted line in FIG. 4 is executed according to the blocking average method.

Assume that p X M data items for p disk rotation cycles stored in the output RAM are represented as follows.

$x(1, 0), x(1, 1), \ldots, x(1, M-1)$ $x(2, 0), x(2, 1), \ldots, x(2, M-1)$ $x(p, 0), x(p, 1), \ldots, x(p, M-1)$ Assume data items undergone the blocking average processing to be $y(0), y(1), \ldots,$ and $y(M-1)$. Arbitrary data $y(i)$ ($i=0, \ldots, M-1$) is obtained from $$y(i) = \frac{x(1, i) + x(2, i) + \ldots + x(p, i)}{p}$$

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A tracking following apparatus for an optical disk device, comprising:

an objective for focusing a laser light and forming a light spot on a rotating optical disk;

detecting means for sensing an error signal representing a relative positional error between the light spot and a track on the optical disk;

fine actuator means responsive to the error signal sensed by the detecting means for driving the objective;

coarse actuator means for driving the fine actuator means;

low-pass filter means for removing a high-frequency component from the error signal from the detecting means;

storage means for keeping therein data associated with one rotation of the optical disk, the data being used to drive the coarse actuator means;

attenuator means for attenuating an output from the low-pass filter means;

arithmetic and logic means for adding an attenuated signal from the attenuator means to data stored in the storage means and storing a result of the addition in the storage means, the data associated with a rotation angle position of the optical disk when the error signal is sensed by the detecting means; and adder means for adding an output from the low-pass filter means to data corresponding to the rotation angle position read from the storage means, producing thereby a drive signal to drive the coarse actuator, and driving the coarse actuator according to the generated drive signal.

2. An apparatus according to claim 1, wherein the arithmetic and logic means includes:

decision means for deciding whether or not the output from the low-pass filter means is equal to or less than a predetermined value during one rotation of the optical disk; and means operative when the output is decided to be equal to or less than a predetermined value by the decision means for stopping operation of the arithmetic and logic means.

3. A track following apparatus for an optical disk device, comprising:

an objective for focusing a laser light and forming a light spot on a rotating optical disk;

detecting means for sensing an error signal representing a relative positional error between the light spot and a track on the optical disk;

fine actuator means responsive to the error signal sensed by the detecting means for driving the objective;

coarse actuator means for driving the fine actuator means;

low-pass filter means for removing a high frequency component from the error signal from the detecting means;

attenuator means for attenuating an output from the low-pass filter means;

storage means for storing information associated with one rotation of the optical disk, the information being used to drive the coarse actuator means; and means responsive to the information stored in the storage means and read therefrom for producing a drive signal for driving the coarse actuator, the means responsive to the information stored in the storage means includes arithmetic and logic means for adding an attenuated signal from the attenuator means to information stored in the storage means and storing a result of the addition in the storage means, the information being associated with a rotation angle position of the optical disk when the error signal is sensed by the detecting means, and adder means for adding an output from the low-pass filter means to the information corresponding to the rotation angle position read from the storage means, producing thereby the drive signal to drive the coarse actuator, and driving the coarse actuator according to the produced drive signal.

* * * * *